(12) United States Patent
Spiegelberg et al.

(10) Patent No.: US 8,012,578 B2
(45) Date of Patent: Sep. 6, 2011

(54) METHOD FOR PRODUCING COMPOSITE MATERIALS

(75) Inventors: Susanne Spiegelberg, Aachen (DE); Armin Alteheld, Bad Kreuznach (DE); Xiaomin Zhu, Aachen (DE); Karin Peter, Aachen (DE); Martin Möller, Aachen (DE)

(73) Assignee: Deutsches Wollforschungsinstitut an der RWTH Aachen e.V. (DE)

( * ) Notice: Subject to any disclaimer, the term of this patent is extended or adjusted under 35 U.S.C. 154(b) by 535 days.

(21) Appl. No.: 12/065,848

(22) PCT Filed: Sep. 4, 2006

(86) PCT No.: PCT/EP2006/008614
§ 371 (c)(1),
(2), (4) Date: Dec. 22, 2008

(87) PCT Pub. No.: WO2007/028563
PCT Pub. Date: Mar. 15, 2007

(65) Prior Publication Data
US 2009/0155562 A1    Jun. 18, 2009

(30) Foreign Application Priority Data

Sep. 5, 2005  (DE) .................. 10 2005 042 138

(51) Int. Cl.
*B32B 27/00* (2006.01)
*C08G 77/00* (2006.01)
(52) U.S. Cl. ............. 428/319.7; 428/137; 428/149; 428/221; 528/10; 528/14; 528/16

(58) Field of Classification Search .......... 428/149, 428/221
See application file for complete search history.

(56) References Cited

U.S. PATENT DOCUMENTS

| | | | | |
|---|---|---|---|---|
| 2,456,251 | A * | 12/1948 | Boughton et al. | 428/324 |
| 4,493,918 | A * | 1/1985 | Meyer et al. | 524/451 |
| 4,842,901 | A | 6/1989 | Merrem | |
| 6,835,766 | B1 | 12/2004 | Gao et al. | |
| 6,979,492 | B2 * | 12/2005 | Sunkara | 428/364 |
| 7,250,127 | B2 * | 7/2007 | Geck et al. | 264/142 |
| 2002/0127474 | A1 * | 9/2002 | Fleischer et al. | 429/309 |
| 2003/0219640 | A1 * | 11/2003 | Nam et al. | 429/33 |
| 2004/0062966 | A1 * | 4/2004 | Goedel et al. | 429/30 |
| 2004/0214921 | A1 | 10/2004 | Chaiko | |

(Continued)

FOREIGN PATENT DOCUMENTS

WO    WO 99/47598    9/1999

(Continued)

OTHER PUBLICATIONS

Zhu et al. "One-Pot Synthesis of Hyperbranched Polyethoxysiloxanes", Macromolecules, 2006, 39, 1701-1708.*

(Continued)

*Primary Examiner* — Robert Loewe
(74) *Attorney, Agent, or Firm* — Viksnins Harris & Padys PLLP

(57) ABSTRACT

The present invention relates to a process for the preparation of composites from thermoplastic polymers and (semi)metal oxides, in particular silicon dioxide, wherein at least a part of the (semi)metal oxides is dispersed in the polymers in nano-dispersed manner (nanocomposites). The invention relates to the composites obtainable by this process and their processing to give molded articles.

17 Claims, 3 Drawing Sheets

U.S. PATENT DOCUMENTS

Figure 3:
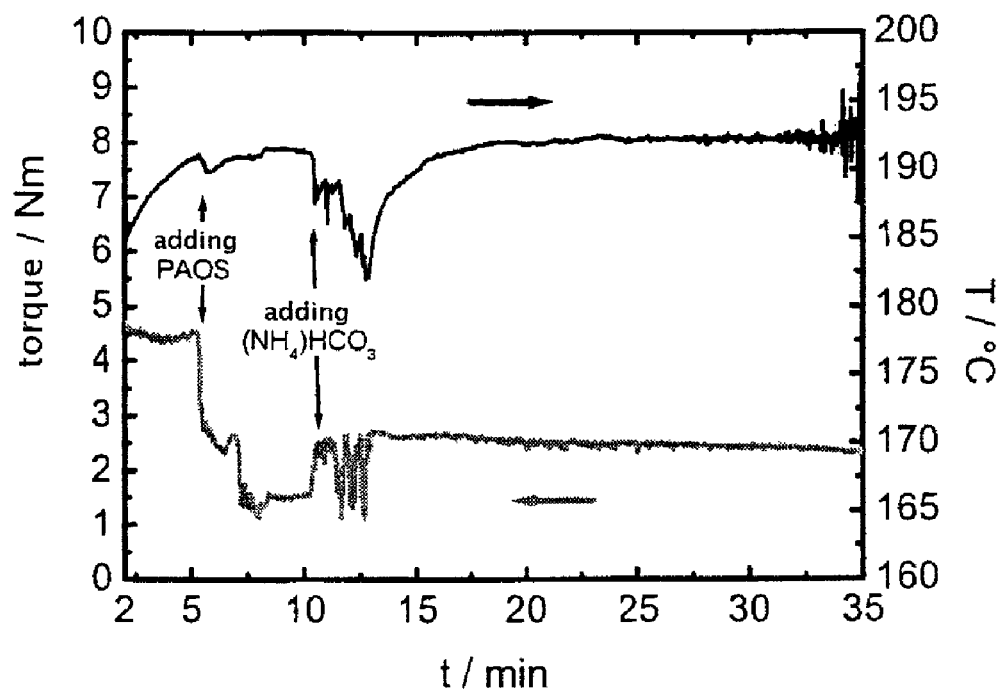

2004/0260000 A1 12/2004 Chaiko
2008/0010959 A1* 1/2008 Gillingham et al. ............ 55/486
2010/0080949 A1* 4/2010 Ou et al. ......................... 428/80

FOREIGN PATENT DOCUMENTS

WO     WO 01/12678     2/2001
WO     WO 02/064664     8/2002
WO     WO 2004/058859     7/2004

OTHER PUBLICATIONS

Jaumann et al. "Hyperbranched Polyalkoxysiloxanes via AB3-Type Monomers" Macromol. Chem. Phys. 2003, 204, 1014-1026.*

Hedrick et al. "Structure Control in Organic-Inorganic Hybrids Using Hyperbranched High-Temperature Polymers" Macromolecules, 1997, 30, 7607-7610.*

Singh et al.; "Toughening of a brittle thermosetting polymer: Effects of reinforcement Particle size and volume fraction" Journal of Materials Science, 2002, 37, 781-788.

Kashiwagi et al., "Thermal Degradation and Flammability Properties of Nanocomposites", Nanocomposites 2002—Delivering New Values to Polymers, 2002.

Garcia et al., Large-scale extrusion processing and characterization of hybrid nylon-6/$siO_2$ nanocomposites', Polymers for Advanced Technologies, 2004, 15, 164-172.

Kuo et al., "PEEK composites reinforced by nano-sized $siO_2$ and $Al_2O_3$ particulates", Materials and Chemistry Physics, 2005, 90, 185-195.

Liao et al., "Preparation of poly(butyl methacrylate)/y-$Al_2O_3$ nanocomposites via ultrasonic irradiation", Polymer International, 2001, 50, 207-212.

Vaia et al., "Synthesis and Properties of Two-Dimensional Nanostructures by Direct Intercalation of Polymer Melts in Layered Silicates", Chem. Mater., 1993, 5, 1694-1696.

Vaia et al., "Microstructural Evolution of Melt Intercalated Polymer-Organically Modified Layered Silicates Nanocomposites", Chem. Mater., 1996, 8, 2628-2635.

Yu et al., "Preparation and properties of poly(vinyl alcohol)—clay nanocomposite materials", Science Direct, 2003, 44, 3553-3560.

Maity et al., Water-Dispersible Conducting Nanocomposites of Binary polymer Systems. I. Poly($N$-vinylcarbazole)—Polyaniline—$Al_2O_3$ Nanocomposite System, Journal of Applied Polymer Science, 2004, 94, 803-811.

* cited by examiner

Figure 1:
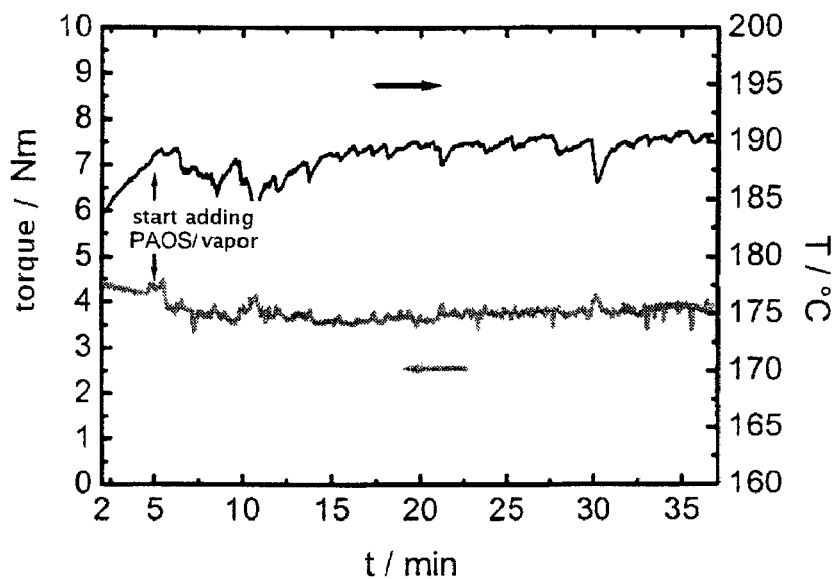
Figures 2a and 2b:
2a:
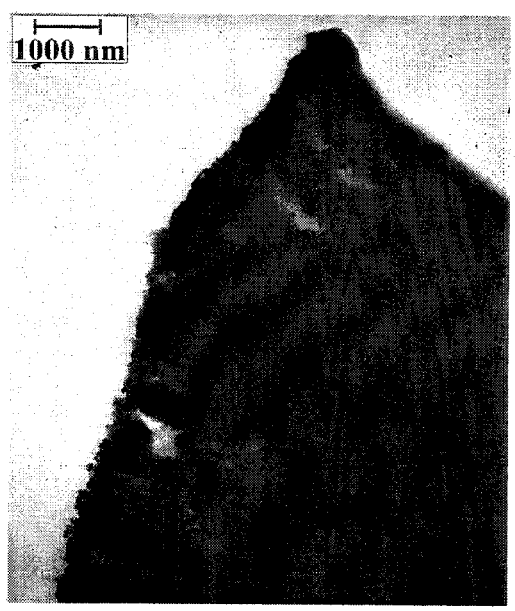
2b:
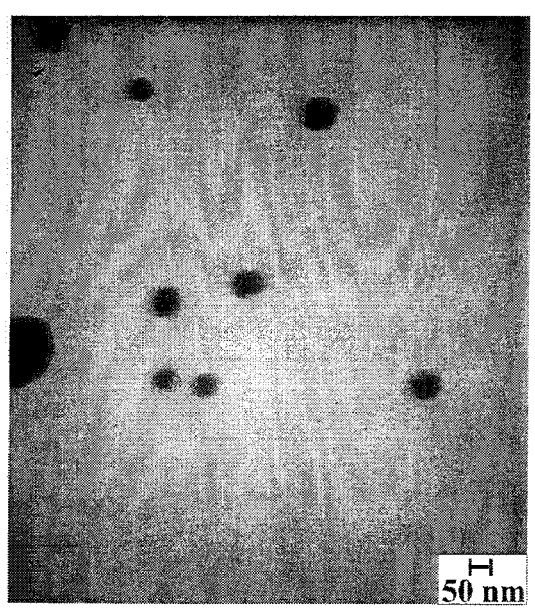

METHOD FOR PRODUCING COMPOSITE MATERIALS

RELATED APPLICATIONS

This application is a National Stage application under 35 U.S.C. §371 and claims the benefit of priority of International Application No. PCT/EP2006/008614 having an International Filing Date of Sep. 4, 2006 which claims the benefit of priority of German Application Serial No. 102005042138.5 filed on Sep. 5, 2005, which are hereby incorporated by reference herein in their entireties.

The present invention relates to a process for the preparation of composites from thermoplastic polymers and (semi) metal oxides, in particular silicon dioxide, wherein at least a part of the (semi)metal oxides is dispersed in the polymers in nanodispersed manner (nanocomposites). The invention relates to the composites obtainable by this process and their processing to give molded articles.

Nanocomposites, i.e. composites on a polymer basis, which contain an inorganic component, e.g. an inorganic (semi)metal oxide, in the form of dispersed nanoparticles, i.e. particles with dimensions below 1 μm and in particular below 500 nm (in the following also nanoscale particles) in the polymer matrix, exhibit due to the large surface of the nanoparticles a high potential regarding their chemical, physical and mechanical properties, which can not be achieved via milli- and micro-scale dispersions of conventional inorganic components (R. P. Singh, et al., Journal of Material Science 2002, 37, 781).

The processes known so far for the preparation of inorganic-organic nanocomposites are based on direct blending of nanoparticles with a polymer in a solution or melt, in-situ polymerization in the presence of nanoparticles, the use of phyllosilicates and sol-gel technologies.

The direct blending of the nanoscale inorganic component in a solution of the polymers, described by T. Kashiwagi et al., Proceedings of the Nanocomposites-Delivering New Value to Polymers, San Diego, Calif., 2002, is a simple method, which, however, is limited to soluble polymers. In addition, huge amounts of solvents must be employed in this process.

On the other hand, the direct blending of silicon dioxide nanoparticles in the polymer melt, described by M. Gracia et al., Polymers for Advanced Technologies 2004, 15, 164, is environmentally friendlier since solvents are not required. Due to the mostly high agglomeration of the nanoparticles and thereby required tremendous shearing forces, the fine distribution of nanoparticles in a bigger amount is hardly possible. With agglomeration-free nanoparticles, the maximal introducible amount is additionally limited due to the rapid increase of the viscosity of the melt.

The preparation of nanocomposites by polymerizing organic monomers in the presence of inorganic nanoparticles (what is known as in-situ preparation of nanocomposites) has been reported on various occasions. M. C. Kuo et al. (Materials Chemistry and Physics 2005, 90(1), 185) describe the production of mechanically reinforced nanocomposites by preparing a polyetheretherketone (PEEK) in the presence of $SiO_2$- or $Al_2O_3$-nanoparticles. A. Maity et al. (Journal of Applied Polymer Science 2004, 94(2), 803) describe the preparation of poly(N-vinylcarbazole)-polyaniline in the presence of nanoparticles, the corresponding nanocomposites being obtained. Y. Liao et al. (Polymer International 2001, 50(2), 207) describe the polymerization of butylmethacrylate in the presence of nanoparticles to obtain nanocomposites based on poly(butylmethacrylate).

A great disadvantage of the in-situ nanocomposite preparation is the thereby occurring agglomerate formation of the nanoparticles employed, resulting in the formation of inhomogeneous products. Thus the advantage of the nanoparticles to form expanded interfaces with the polymer due to their large surface can not be utilized. Moreover, because of the small particle size, the introduction of powdery nanofiller results in a high health risk during the compounding due to the dust formation and the respirability of the nanoparticles.

For the preparation of polymer based nanocomposites by using phyllosilicates two methods are described in the literature. According to the first method the polymer is blended with clay minerals (see Yuan-Hsiang Yu et al., Polymer 2003, 44(12), 3553). As clay minerals, smectites such as montmorillonite $(M_x(Al_{4-x}Mg_x)Si_8O_{20}(OH)_4)$ are used. Here, M is an exchangeable monovalent cation, and x is the degree of the isomorphic substitution. Initially, the intercalation of organic molecules into the layered structure takes place, and then the exfoliation, the single layers being separated from each other. The thus obtained material is then dispersed in a polymer matrix. It should be noted that the result of the exfoliation is strongly influenced by mechanical loads.

U.S. Pat. No. 6,835,766 describes the preparation of polymer/clay composites via pressing of the components. For example, at first polyethylenoxide and montmorillonite minerals are mixed in the powder form, and afterwards the mixture is pressed at a temperature below the glass transition temperature or the melting temperature of the polymer.

R. A. Vaia et al. (Chem. Mater. 1993, 5, 1694 and Chem. Mater. 1996, 8, 2628) describe the direct intercalation of macromolecules into the guest silicate.

US 2004/214921 describes the preparation of polymer/phyllosilicate composites comprising phyllosilicates of the group of the hydrophilic organo-phyllosilicates, a polyolefin and a polymeric surfactant. Here, the polymeric surfactant is initially blended with the phyllosilicate, the former being adsorbed on the surface of the phyllosilicate, and thus leads to the exfoliation of the phyllosilicate during pressing with the polyolefin.

According to the second method the organic compounds are initially intercalated in the phyllosilicates. Then, polymerization of the monomers, which form the polymer component of the composite, is carried out in the presence of the thus obtained material. The intercalation of organic compounds in the phyllosilicates can be achieved e.g. with organic ammonium compounds or suitable monomers (see e.g. US 2004/260000).

WO 2001/012678 describes the preparation of polyamide composites by in-situ polymerization of a caprolactam melt, which contains dispersed exfoliated layers of montmorillonite.

WO 99/47598 describes the preparation of polyolefin nanocomposites. Here, a special clay mineral is at first swollen in water. After subsequent freeze-drying to remove the water single silicate layers with dimensions in the nanometer range are formed, which are dispersed in nonpolar organic solvents. The aftertreatment with methyl alumoxane and the slow addition of a Ziegler-Natta catalyst leads to the formation of a complex, which enhances the stability of the dispersion. The nanocomposites are subsequently produced via direct in-situ polymerization of olefins or styrene in the presence of the nanoparticles.

The desired properties of the nanocomposites, such as improved mechanical properties, increased abrasion resistance, better barrier properties or lower flammability can, however, only be achieved when the exfoliated silicate layers are homogeneously distributed in the polymer matrix. In this regard, the herein described processes using in-situ polymerization are problematic, since they lead to an inhomogeneous distribution of the silicate layers in the composite. The nanocomposites prepared in the melt have the disadvantage that only polar molecules can induce the intercalation process, and with the increasing volume fraction of clay minerals the melt viscosity increases dramatically to a critical value, which makes the further processing in the melt impossible.

WO 02/064664 describes water-free hydrolysable sol-gel systems, in which a polymerization is effected in a mixture of (semi)metalalkoxides, e.g. tetraalkoxysilanes such as tetraethoxysilane, or (fluoro)alkyltrialkoxysilanes such as octyltriethoxysilane or fluoroalkyltriethoxysilane and water-free carboxylic acids, e.g. acetic acid, formic acid, fluorocarboxylic acid, acetoacetic acid or succinic acid or carboxylic acid anhydrides via the addition of suitable catalysts such as mineral acids, in particular hydrochloric acid to form polymeric polyalkyl(semi)metalates and the corresponding carboxylic acid alkyl ester. Non-polar substances such as poly(methylmethacrylate) are soluble in this solution, which can then be applied as a coating onto a surface. A variation of this process is the use of carboxylic acids with a functional group from the group of acrylic acid, methacrylic acid, maleic acid or crotonic acid. Thereby, a mixture is obtained, which can be cross-linked radically or under UV-irradiation and forms a solid thermosetting nanocomposite. Disadvantages of this method are the very long reaction times of 20 days. Furthermore, huge amounts of carboxylic acid esters are formed, which have to be removed from the composite material. Moreover, the process is limited to polymers which are soluble in the carboxylic acid esters.

WO 2004/058859 describes the preparation of liquid polyalkyl(semi)metalates of silicon, titanium, zirconium or hafnium by reacting the corresponding (semi)metal alkoxides with the anhydride of an aliphatic $C_2$-$C_4$-carboxylic acid and removal of the thereby formed ester. The thus obtained liquid products can be introduced into the melts of thermoplastic polymers as liquid additive. It proves to be adverse that the formation of a (semi)metal oxide phase proceeds very slowly under these conditions and is not subject to any control. Due to the long reaction times and high temperatures phase separation processes are possible which prevent a uniform distribution of the nanoscale particles in the polymer phase, and for this reason lead to only badly reproducible results.

It is therefore an object of the present invention to provide a process for the preparation of inorganic-organic nanocomposites on the basis of thermoplastic polymers, which resolves the problems of prior art, and particularly enables the homogeneous introduction of a larger quantity of oxide components with dimensions in the nanometer range into a thermoplastic polymer matrix without the need of huge amounts of organic solvents.

It has been found, that these and further objects are surprisingly achieved by the process described below.

Accordingly, the present invention relates to a process for the preparation of composites from at least one thermoplastic polymer and at least one (semi)metal oxide distributed in the polymer in nanodispersed manner, comprising the following steps:
 i. introduction of at least one liquid polyalkyl(semi)metalate into a melt of at least one thermoplastic polymer and
 ii. controlled condensation of the polyalkyl(semi)metalate in the polymer melt by adding at least one substance catalyzing the condensation (catalyst) forming a (semi) metal oxide phase distributed in the polymer in nanodispersed manner.

The present invention is based on an essentially water-free and solvent-free sol-gel process, which enables the in-situ formation of (semi)metal oxide phases in the form of finely distributed nanoparticles in polymer melts and/or nanoparticular layers on molded articles prepared thereof. It thus provides a novel process for the preparation of manifold nanocomposites.

By the process according to the invention composites based on thermoplastic polymers are obtained, which comprise at least one (semi)metal oxide phase being distributed in the polymer(s) in dispersed manner, the (semi)metal oxide phase being distributed in a polymer matrix formed by the polymer(s) in nanodispersed manner. Unlike the known processes, the distribution of the nanodispersed (semi)metal oxide phase is essentially homogeneous, i.e. the nanodispersed (semi)metal oxide phase is essentially uniformly distributed in the polymer matrix.

At the same time, small amounts of the nanodispersed (semi)metal oxide phase may be concentrated in the surface regions of the polymer matrix due to segregation processes, thus imparting a higher surface hardness to the nanocomposite after the condensation. The formation of a thin surface layer of the (semi)metal oxide phase is presumably attributed to the migration (segregation) of the polyalkyl(semi)metalate to the surface regions and subsequent condensation of the polyalkyl(semi)metalate on the surface of the molded articles prepared from the thus modified polymer melt under the influence of the catalyst and humidity. The formation of this thin surface layer can be specifically affected via the process according to the invention, as is described further below, and therefore is also an object of the present invention.

A nanodispersed distribution of the (semi)metal oxide phase means a distribution of very small and discrete zones of the (semi)metal oxide phase in the coherent polymer matrix with dimensions in the nanometer range. In general, the phase areas of the (semi)metal oxide phase have dimensions below 500 nm and especially below 200 nm.

The composites obtained by the process according to the invention are novel and also an object of the present invention.

The introduction of the liquid polyalkyl(semi)metalate into the melt of the at least one thermoplastic polymer can be carried out conventionally by blending the components in mixing devices for polymer melts customary for this purpose, such as mixing mills, kneaders, extruders including single- and twin-screw extruders, and the like. Suitable mixing devices are well-known to the person skilled in the art, e.g. from A. Echte, Handbuch der technischen Polymerchemie (Handbook of technical polymer chemistry), VCH, Weinheim 1993, p. 111-120.

The introduction can in principle be promoted by adding organic solvents, which are able to dissolve or swell the polymers. However, this is not required. It is advantageous to introduce the polyalkyl(semi)metalates into the polymer melt without or only with small amounts of organic solvents (<10% by weight based on the polyalkyl(semi)metalate used).

As a rule, the introduction is carried out at temperatures above the softening or melting temperature of the thermoplastic polymer, e.g. at temperatures, which are at least 10 K and in particular at least 20 K above the softening or melting temperature, and typically at temperatures above 100° C., in particular in the range of from 150° C. to 300° C.

The term polyalkyl(semi)metalate is a synonym for the esters of (hetero)polyacids of metals. Accordingly, here they are oligomers or polymeric condensation products of (semi) metal alkoxides, as they are described on various occasions in the prior art. Examples of polyalkyl(semi)metalates according to the invention are condensation products of (semi)metal alkoxylates of silicon, boron, titanium, hafnium or zirconium. Such condensation products are, for example, described in WO 2004/058859, the disclosure of which is herewith incorporated by reference.

Condensation products of alcoholates of the formula I are preferred $$M(OR)_4 \tag{I}$$

wherein R can be the same or different, and is $C_1$-$C_{18}$-Alkyl, preferably $C_1$-$C_4$-alkyl and in particular ethyl, and M is Si, Ti, Zr or Hf and in particular Si, as well as condensation products of alcoholates of the formula II $$R^b M(OR^a)_3 \tag{II}$$

wherein M has the meaning mentioned before, $R^b$ can be the same or different, and is $C_1$-$C_{18}$-Alkyl, preferably $C_1$-$C_4$-alkyl and in particular ethyl, $R^b$ is alkyl, alkoxy with more than 4 C-atoms, alkenyl, haloalkyl, alkoxyalkyl, cycloalkyl, phenyl, or phenylalkyl, in which the cycloalkyl and phenyl rings of the three last mentioned groups may also carry 1 to 5 substituents, which are selected e.g. from halogen, $C_1$-$C_4$-alkyl, $C_1$-$C_4$-haloalkyl, $C_1$-$C_4$-alkoxy and the like, and co-condensation products of alcoholates of the formula I with alcoholates of the formulae II, III and/or IV $$(R^c)_2 M(OR^a)_2 \tag{III}$$

$$(R^d)_3 M(OR^a) \tag{IV}$$

wherein M has the meaning mentioned before, $R^a$ has the meaning denoted for formula II and $R^c$ and $R^d$ can each be the same or different, and have one of the meanings denoted for $R^b$.

Condensation products of alcoholates of the formula I as well as co-condensation products of alcoholates of the formula I with alcoholates of the formulae II, III and/or IV are denoted in the following also as modified polyalkyl(semi)metalates.

Here and in the following, alkyl is a saturated, linear or branched aliphatic hydrocarbon moiety with normally 1 to 20 C-atoms, e.g. methyl, ethyl, n-propyl, isopropyl, n-butyl, 2-butyl, n-hexyl, n-octyl, 2-ethylhexyl, nonyl, decyl, dodecyl, tridecyl, tetradecyl, hexadecyl, octadecyl and the like.

Here and in the following, alkenyl is a mono- or polyunsaturated, linear or branched aliphatic hydrocarbon moiety with normally 2 to 20 C-atoms, e.g. ethenyl, propen-1-yl, propen-2-yl and the like.

Alkoxy is an alkyl moiety, as defined above, which is bonded via an oxygen atom, e.g. methoxy, ethoxy, n-propoxy, n-butoxy, tert-butoxy and the like.

Alkoxyalkyl is an alkyl moiety with preferably 1 to 4 C-atoms, which carries an alkoxy group with preferably 1 to 4 C-atoms.

Haloalkyl is an alkyl group, as defined above, the hydrogen atoms being partially or fully substituted by halogen atoms, in particular by chlorine and/or fluorine atoms.

Cycloalkyl is a cycloaliphatic hydrocarbon moiety with normally 5 to 10 C-atoms, such as cyclopentyl, cyclohexyl, cyclooctyl, bicycloheptyl and the like.

The polyalkyl(semi)metalate preferable has a number-average molecular weight of at least 1000 Dalton, in particular at least 1500 Dalton, and especially preferably at least 2000 Dalton. Advantageously, the number-average molecular weight does not exceed 20000 Dalton, in particular 15000 Dalton.

Advantageously, polyalkyl(semi)metalates are branched oligomers or polymers. In particular, polyalkyl(semi)metalates, which have a degree of branching according to Frey in the range of from 0.2 to 0.8 and in particular in the range of from 0.3 to 0.7, are preferred. The degree of branching (DB) according to Frey (see D. Hölter, A. Burgath, H. Frey, Acta Polymerica 1997, 48, p. 30) is defined by the formula stated on p. 11 in WO 2004/058849, which is herewith incorporated by reference.

Advantageously, the liquid polyalkyl(semi)metalate has a viscosity at room temperature below 100000 Pa·s, in particular below 50000 Pa·s and especially not more than 5000 Pa·s, e.g. in the range of from 0.01 to 5000 Pa·s.

Furthermore, polyalkyl(semi)metalates, which have no detectable (semi)metal-bonded OH-groups, are preferred.

The liquid polyalkyl(semi)metalate is in particular a liquid, particularly highly branched poly[alkylsilicate], e.g. a poly[($C_{1-18}$-alkyl)silicate], i.e. a liquid, particularly highly branched condensation product of a tetraalkylsilicate, e.g. a tetra-$C_{1-18}$-alkylsilicate, in particular a tetra-$C_1$-$C_4$-silicate (compound I with M=Si), or a modified, liquid poly[($C_{1-18}$-alkyl)silicate], i.e. a liquid co-condensation product of a tetra-$C_{1-18}$-alkylsilicate with at least one of the aforementioned compounds II, III or IV, with M in the formulae II, III and IV being in particular silicon.

The polyalkyl(semi)metalate is especially preferred a condensation product of the compounds I or a co-condensation product of at least one compound I with at least one further compound II, III and/or IV, which has been prepared by reacting these compounds with the anhydride of an aliphatic $C_2$-$C_4$-carboxylic acid such as acetic acid anhydride and removing the $C_1$-$C_4$-alkyl ester of the aliphatic $C_2$-$C_4$-carboxylic acid formed during the reaction under the conditions stated in WO 2004/058859.

Usually, the liquid polyalkyl(semi)metalate is used in an amount of from 0.1 to 50% by weight, particularly in an amount of 1 to 40% by weight and especially in an amount of 1 to 30% by weight, based on the thermoplastic polymer.

With regard to the thermoplastic polymers there are basically no limitations. Suitable are, for example, polyolefins such as polyethylene including LDPE, HDPE and LLDPE, polypropylene, polystyrenes, poly(meth)acrylic acid esters such as polybutylacrylate, polymethylmethacrylates, polyacrylnitrile, polycarbonates, polyarylene ether, polyarylene ether ketones including PEK, PEEK, PEKK, PEEKK, PEKEKK, PEEKEK and PEEEK, polyarylene ether sulfones, aliphatic and aromatic polyamides such as nylon 6, nylon 6,6, aliphatic and aromatic polyesters, polyoxymethylene and the like.

According to the invention, in step ii a conversion of polyalkyl(semi)metalate into a nanoparticular (semi)metal oxide phase is carried out. The conversion is presumably effected by the presence of water, e.g. traces of water from the environment, together with the high temperatures required for the melting of the polymer, and controlled regarding time and rate via the presence of the catalyst in such a manner that a uniform formation of the nanodispersed (semi)metal oxide phase in the polymer matrix is effected.

By the specific control of the reaction rate of the condensation in the direction of a slow condensation, e.g. via the selection of the catalyst and, if necessary, the temperature, as well as via the exclusion of water, the portion of the polyalkyl (semi)metalate migrated to the surface can be increased, and the formation of a thin surface layer from a nanoparticular (semi)metal oxide phase after condensation of the polyalkyl (semi)metalate can be promoted.

For this, the catalyst can be introduced into the polymer melt separately or together with the polyalkyl(semi)metalate. The catalyst is added preferably as a mixture with the polyalkyl(semi)metalate. The catalysts are added advantageously in an amount of from 0.01 to 10% by weight, in particular from 0.1 to 5% by weight based on the polyalkyl(semi)metalate.

Typically, the temperatures required for the conversion are above 150° C., in particular above 180° C., e.g. in the range of from 180 to 300° C.

The condensation of the liquid polyalkyl(semi)metalate can be controlled via catalysts of different types with and without water. Typically, traces of water from the environment suffice. However, small amounts of water can be added, or the condensation can be effected without water.

Suitable catalysts include acid substances including Lewis acids, basic substances and so-called transesterification catalysts.

According to a first embodiment of the invention the condensation of the liquid polyalkyl(semi)metalate is effected by adding a Brönsted or Lewis acid, the latter being preferred. The Brönsted acid as well as the Lewis Acid can be added as such or in the form of a substance, which releases such an acid.

Examples of suitable Brönsted acids are $C_1$-$C_4$-carboxylic acids such as acetic acid or formic acid, hydrochloric acid as well as organic sulfonic acids such as benzenesulfonic acid, p-toluenesulfonic acid, methanesulfonic acid and trifluoromethanesulfonic acid (triflic acid).

The catalyst is preferably selected from Lewis acids and substances, which release Lewis acids. Examples of Lewis acids and substances, which release Lewis acids, are boron halogenides such as boron trifluoride and boron trichloride, bromides and chlorides of phosphor such as phosphor trichloride, phosphor tribromide, phosphor pentabromide, and phosphor pentachloride, furthermore aluminum trichloride, aluminum tribromide, chlorides of antimony, iron, zinc or tin, such as $SbCl_5$, $SnCl_4$, $FeCl_3$ or $ZnCl_2$.

Preferred acid catalysts are organic sulfonic acids such as p-toluenesulfonic acid and trifluoromethanesulfonic acid, boron trifluoride, chloride of boron, aluminum, phosphor, antimony, iron, zinc or tin.

Such acid catalysts are introduced advantageously in an amount of from 0.01 to 10% by weight, in particular from 0.1 to 5% by weight based on the polyalkyl(semi)metalate.

In principle, the catalyst can be introduced into the polymer melt separately or together with the polyalkyl(semi)metalate. In the case of acid catalysts the catalyst will be added preferably as a mixture with polyalkyl(semi)metalate.

According to a second embodiment of the invention, the condensation of the liquid polyalkyl(semi)metalate is catalyzed by adding a base, preferably in combination with water. Suitable bases are in particular ammonia, metal hydroxides, in particular alkaline metal hydroxides such as sodium or potassium hydroxide, earth alkaline metal hydroxide such as magnesium hydroxide or aluminum hydroxide, organic amines, in particular tertiary amines and pyridines, e.g. N,N-dimethylaminopyridine or N,N,N',N'-tetramethyl-1,6-diaminohexane.

If ammonia is used as a base, it can also be introduced in the form of an ammonia-releasing substance. Basic ammonium salts such as ammonium carbonate, ammonium hydrogensulfate or ammonium hydrogencarbonate are particularly suitable as ammonia-releasing substances. At the temperatures required for the melting of the polymer the latter supplies both ammonia and water.

Ammonia or the ammonia-releasing substance is used preferably in an amount of from 1 to 10% by weight, calculated as ammonia and based on the polyalkyl(semi)metalate.

The ammonia or the ammonia-releasing substance can be introduced into the polymer melt together with the polyalkyl(semi)metalate or separately therefrom. Preferably, the polyalkyl(semi)metalate is introduced at first into the polymer melt, until a nearly uniform distribution is achieved, and then ammonia or an ammonia-releasing substance and water are introduced.

According to a further embodiment of the invention the condensation is catalyzed by a so-called transesterification catalyst. These are neutral, weakly basic or weakly Lewis-acidic, oxygen-containing (semi)metal compounds with organic moieties, which on their part can form polyalkyl (semi)metalates. These include di-, tri-, or tetraalkylmetalate, in particular di-, tri-, or tetra-$C_2$-$C_6$-alkylmetalate or acetates of zirconium, tin, silicon, aluminum, zinc, magnesium or titanium, such as tetraethyltitanate, tetrabutyltitanate, tetrabutylstannate, ethyltriacetoxysilane, tetrabutylzirconate and tetraethylzirconate, trialkoxyvanadium(V) oxides (=trialkylvanadates) such as vanadium(V) triisopropoxide oxide (vanadium(V)-triisopropoxy oxide, $VO(OCH(CH_3)_2)$), furthermore titanium trimethylsiloxane, dialkoxytitanium-bis (ethylacetoacetonate), in particular di-$C_2$-$C_6$-alkoxytitanium-bis(ethylacetoacetonate) such as titanium diisopropoxide-bis(ethylacetoacetonate) as well as salts of tin, magnesium, aluminum, zinc, lead, calcium, barium, strontium or zirconium with aliphatic carboxylic acids such as di-n-butyldilaurylstannate (di-n-butyltindilaurate [$CH_3$—$(CH_2)_{10}COO]_2Sn(n-C_4H_9)_2$), di-n-butyltinacetate, bis(2-ethylhexanoate)tin(II) (tin(II)-2-ethylhexanoate), tin(II) acetate, magnesium(II) acetate and aluminum(III) acetate.

Preferred transesterification catalysts are tetra-$C_2$-$C_6$-alkylmetalates of zirconium and titanium, tri-$C_2$-$C_6$-alkylmetalates of aluminum, tri-$C_2$-$C_6$-alkylvanadates as well as acetates of magnesium, tin, aluminum and lead.

Mixtures of transesterification catalysts with Brönsted acids or with anhydrides of Brönsted acids, e.g. with anhydrides of organic carboxylic acids such as acetic anhydride, are also suitable.

The use of water-free catalysts or catalytically active compounds, which on their part do not react with polyalkyl(semi) metalates in the absence of water or an organic carboxylic acid or a carboxylic acid anhydride thereof in a manner that would cause the integration of the catalyst into the (semi) metal oxide phase forming, leads to a slow, controlled condensation and thus increases the portion of segregation of the polyalkyl(semi)metalate. Therefore, the use of such catalysts leads to an increased formation of a thin surface layer of the polyalkyl(semi)metalate phase, which is converted to the (semi)metal oxide phase after the condensation under the influence of humidity, for example in the form of air humidity or water vapor, and of the added catalyst. Such catalysts may be selected from the group of either acidic or basic catalysts or trans-esterification catalysts. Preferred examples are tetraalkylmetalates of titanium or tin such as tetraethyltitanate, tetrabutyltitanate or tetrabutylstannate.

The transesterification catalyst can be introduced into the polymer melt separately or together with the polyalkyl(semi) metalate. However, the transesterification catalyst is preferably used as a mixture with the polyalkyl(semi)metalate. Such catalysts are used advantageously in the amount of from 0.01 to 10% by weight, in particular from 0.1 to 5% by weight based on the polyalkyl(semi)metalate.

According to a further embodiment of the invention, a finely divided material with a primary particle size below 500 nm, in particular below 300 nm is introduced into the polymer melt together with the polyalkyl(semi)metalate. For this, the finely divided material is advantageously suspended in the liquid polyalkyl(semi)metalate and this suspension is introduced into the polymer melt.

By this technique, not only a more uniform distribution of the finely divided material in the polymer matrix is achieved, since the aggregation processes can largely or fully be avoided, but also a better compatibility of the finely divided material with the polymer matrix as a result of the coating with the polyalkyl(semi)metalate is achieved.

The finely divided material is typically an oxidic material, for example an oxide of aluminum, silicon, titanium, zirconium or iron, an exfoliated phyllosilicate such as exfoliated kaolinite, smectite, serpentine, talc, muscovite, montmorillonite, saponite, betonite, kanemite, magadiite or kenyaite. Such finely divided materials are well-known to the person skilled in the art, e.g. from the literature (S. S. Ray, M. Okamoto, Progress in Polymer Science 28 (2003) 1539; A. Shimojima, D. Mochizuki, K. Kuroda, Chemistry of Materials 2001, 13, 3603) and some are commercially available under the trade names MMT, Betonite®, Somasif Me 100® or Cloisite®30B.

If desired, the finely divided material is used in an amount of from 1 to 80% by weight, in particular in an amount of from 1 to 50% by weight based on the polyalkyl(semi)metalate.

The nanocomposites obtained by the process according to the invention can be further processed into molded articles by means of customary molding processes such as injection molding, hot pressing, deep-drawing, blow molding and the like.

The following figures and examples are provided for the more detailed explanation of the invention.

FIG. 1: Plastogram during the compounding in Example 1 with torque (lower graph) and temperature (upper graph)

FIG. 2: Transmission electron microscopic micrographs (2*a* and 2*b*) of thin cuts of an injection molded sheet of a PP-based composite prepared according to Example 1

FIG. 3: Plastogram during the compounding in Example 3 with torque (lower graph) and temperature (upper graph)

Figure 4:

FIG. 4: Scanning electron microscopic micrograph (SEM) of the surface of an injection molded sheet of a PP-based composite prepared according to Example 4

Figure 5:
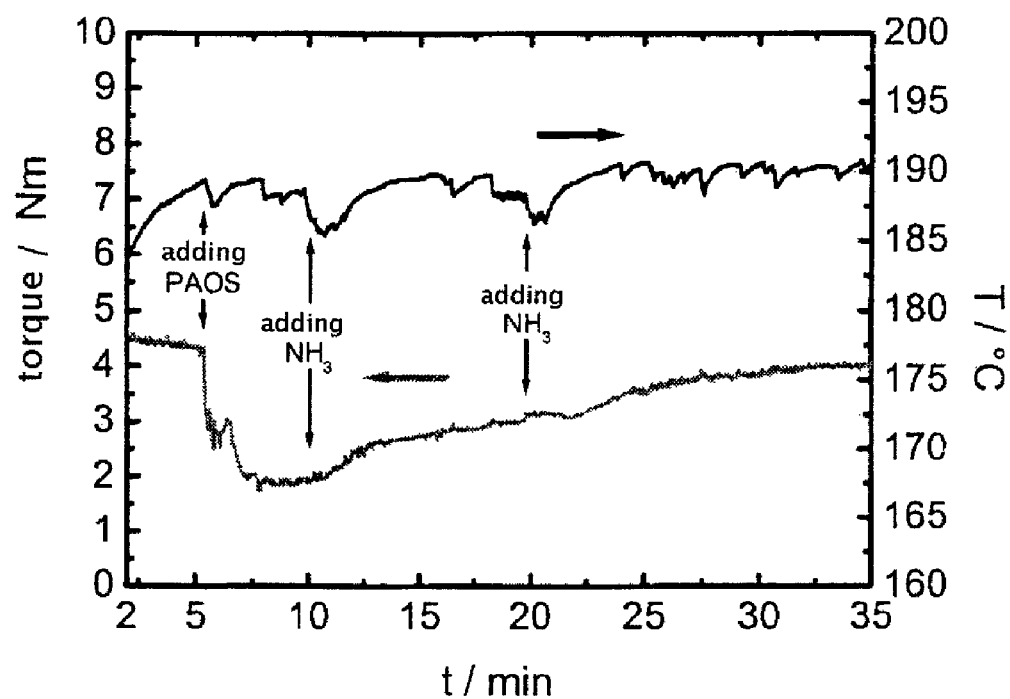

FIG. 5: Plastogram during the compounding in Example 5 with torque (lower graph) and temperature (upper graph)

A CHEMICAL ANALYSIS

The temperature of the maximum mass loss ($T_{max}$), the temperature, at which 5% by weight of the total mass is degraded ($T_{5\%}$), and the $SiO_2$ content resulting from the combustion residue were determined both on powders and on molded articles by means of thermo gravimetric analysis (TGA) of the nanocomposites according to the invention using a pair of thermo scales (NETZSCH TG 209, Netzsch Gerätebau GmbH).

The scanning electron microscopic micrographs (SEM) were taken using a Zeiss 360 Stereo Scan, and the transmission electron microscopic investigations (TEM) were performed using a Zeiss EM 109. Both devices are from Zeiss NTS.

The viscosity was determined using a capillary viscosimeter (from Viscotek, Germany, type HB502B).

The molecular weights were determined by means of size-exclusion chromatography (SEC) in chloroform using a modularly constructed SEC from Knauer, a calibration with fractionated standards with narrow molecular weight distribution being conducted for the acquisition of the absolute molecular weights.

B PREPARATION OF THE POLYALKYL(SEMI)METALATES

Preparation Example 1

Polyethoxysiloxane, Single-Stage Process

In a reaction vessel equipped with a thermometer, a 30 cm Vigreux-column, a Claisen-distillation head and a protective gas supply, 1041.65 g (5.0 mol) of tetraethoxysilane TEOS, 510.45 g (5.0 mol) of acetic anhydride and 3.17 ml (3.42 g; 0.015 mol) of tetra-ethyltitanate (catalyst) were heated to 130° C. (temperature of the oil bath) under nitrogen atmosphere and with intensive stirring. Over a period of 7 h, 816.9 g of ethyl acetate was distilled out. After applying high vacuum, another 73.5 g of distillate was obtained over a period of 5 h. The raw product was subsequently processed using a thin film evaporator (TFE), the low molecular weight components (such as remaining TEOS) being removed at a temperature of 150° C. and at a flow rate of 50 ml/h in high vacuum. 290 g of highly branched, yellow colored polyethoxysiloxane having a viscosity of 17 Pa·s were obtained. The polyethoxysiloxane obtained that way contained 24.2% by weight of silicon. The degree of branching according to Frey (determined by $^{29}$Si-NMR-spectroscopy) was 0.52. The number-average molecular weight was 1800 Dalton, the weight-average molecular weight was 3600.

Preparation Example 2

Polybutoxysiloxane

In a reaction vessel equipped with a short-path distillation head and a protective gas supply, 50.58 g of the raw product of poly(ethoxysiloxane) (not purified using the TFE), 78.61 g (1.06 mol) of butanol and 0.1 g of tetraethyltitanate were heated to an oil bath temperature of 130° C. under nitrogen atmosphere. Over a period of 3 h 45 min, 40.3 g of an ethanol/butanol azeotrope were distilled out. Further volatile components were removed from the raw product by applying high vacuum overnight. 67.1 g of a slightly yellowish colored liquid were obtained, which was processed using the TFE at 150° C./50 ml·h$^{-1}$. 46.8 g of a clear, oily liquid were obtained. The polybutoxysiloxane obtained that way had a number-average molecular weight of 1800 Dalton and a viscosity of 17 Pa·s. The degree of branching remained unchanged at 0.52.

Preparation Example 3

Polyethoxy-co-octadecoxysiloxane

Polyethoxy-co-octadecoxysiloxane was prepared analogously to the polybutoxysiloxane by reacting the polyethoxysiloxane with octadecanol. 43.6 g of a colorless wax having a number-average molecular weight of 1900 Dalton and a melting temperature of approx. 50° C. were obtained.

C INVESTIGATION OF THE MISCIBILITY OF POLYALKOXYSILOXANES (PAOS) FROM THE PREPARATION EXAMPLES 1 TO 3 WITH THERMOPLASTIC POLYMERS SUCH AS POLYPROPYLENE (PP)

In the polymer melt of PP (NOVOLEN, Basell) the miscibility with PAOS is tested. For this, the PAOS is added in small portions to a PP melt in a measuring kneader at 190° C. and each portion is kneaded in for 3 min. As soon as a permanent turbidity occurs (turbidity point), the limit of solubility is reached. The determination of the turbidity point is carried out visually during the addition of PAOS.

TABLE 1

Miscibility of PAOS with PP

| PAOS | Solubility limit [% by weight][1] |
|---|---|
| poly(ethoxysiloxane) | 0.6 |
| poly(butoxysiloxane) | 1.6 |
| poly[(ethoxy-co-octadecoxy)siloxane] | >16 |

[1]based on PP

The solubility of poly(ethoxysiloxane) in PP is 0.6% by weight. The solubility of PAOS in PP is controllable via the modification of the $SiO_2$ precursor. More than 16% by weight of poly(ethoxy-co-octadecoxy)siloxane can be introduced into a visually clear PP melt.

D Examples

Example 1

35 g of PP (NOVOLEN, Basell) were molten in a commercially available kneader (Brabender Plastograph W50EHT) at 35 rpm and 190° C. for 5 min. To this, a mixture of 3.5 g (10% by weight) of poly(ethoxysiloxane) from preparation example 1 and 0.35 g (1% by weight) of tetrabutylorthotitanate was continuously added. The mixture was kneaded for further 30 min. Subsequently the mixture was processed to molded articles by means of injection molding or melt pressing.
$T_{max}$: 461° C.
$T_{5\%}$: 433° C.
$SiO_2$ content after combustion: 7.3% by weight
TEM investigations of thin cuts of an injection molded sheet of a PP-based composite prepared according to Example 1 show a uniform distribution of discrete $SiO_2$ particles (FIGS. 2a and 2b).

Example 2

By analogy to Example 1, 35 g of PP (NOVOLEN, Basell) were molten in a commercially available kneader (Brabender Plastograph W50EHT) at 35 rpm and 190° C. for 5 min. To this, 3.5 g (10% by weight) of poly(ethoxysiloxane) from preparation example 1 were continuously added. After another 10 min at 190° C., 1.75 g (5% by weight) of ammonium hydrogencarbonate were added to the polymer melt. The mixture was kneaded for another 25 min, and was processed to molded articles by means of injection molding or melt pressing.
$T_{max}$: 466° C.
$T_{5\%}$: 348° C.
$SiO_2$ content after combustion: 3.9% by weight Example 3

3.5 g of PP (NOVOLEN, Basell) were molten in a commercially available mini-extruder (DSM Xplore™ 5 cm³ twin-screw micro-compounder) at 200° C. To this, a mixture of 0.18 g (5% by weight) of polyethoxysiloxane from preparation example 1 and 0.018 g (0.5% by weight) of tetrabutylorthotitanate was continuously added over a period of 5 min. After another 10 min of processing, the mixture was processed into molded articles either directly by means of injection molding or after removal from the extruder using melt pressing.
$T_{max}$: 460° C.
$T_{5\%}$: 433° C.
$SiO_2$ content after combustion: 6.2% by weight Example 4

50 kg of PP (HOSTACOM, Basell) were molten in a commercially available extruder (ZSK30 from Werner & Pfleiderer) at 250 rpm and a cylinder temperature of 210° C. To this, a mixture of 2.5 kg (5% by weight) of poly(ethoxysiloxane) from preparation example 1 and 25 g (1% by weight) of tetrabutylorthotitanate were continuously added over a period of 6 h. The strands were drawn off via a water bath and granulated. Later, the granules were processed to sheets by means of injection molding.
$T_{max}$: 462° C.
$T_{5\%}$: 419° C.
$SiO_2$ content after combustion: 3.8% by weight
During the processing a part of the poly(ethoxysiloxane) segregated to the surface and formed there a complete $SiO_2$ layer after condensation. SEM investigations (FIG. 4) show a thin $SiO_2$ layer on the surface as well as $SiO_2$ particles on the cryo-breaking edges inside the composites.
By means of energy dispersive spectroscopy it was found that all analyzed elements are uniformly distributed in the sample.

Example 5

35 g of PP (NOVOLEN, Basell) were molten in a commercially available kneader (Brabender Plastograph W50EHT) at 35 rpm and 190° C. for 5 min. To this, 3.5 g (10% by weight) of poly(ethoxysiloxane) from preparation example 1 were continuously added. During the compounding water vapor from a boiling water bath (temperature of the oil bath 130° C.) was supplied through PTFE tubes. After 10 min and after 20 min, 5 ml each of a 25% ammonia solution were added to the water bath. The further processing was carried out using injection molding and melt pressing.
$T_{max}$: 457° C.
$T_{5\%}$: 401° C.
$SiO_2$ content after combustion: 5.1% by weight
During the processing, a part of the polyethoxysiloxane segregated to the surface of the plastic molded article due to its surface activity and was condensed to a layer of $SiO_2$ particles. According to SEM investigations, the $SiO_2$ particles have dimensions in the range below 100 nm.

The invention claimed is:
1. A process for the preparation of composites from at least one thermoplastic polymer and at least one liquid polyalkyl (semi)metalate, comprising the following steps:
   i. introduction of at least one liquid polyalkyl(semi)metalate of silicon, titanium, zirconium or hafnium into a melt of at least one thermoplastic polymer and
   ii. condensation of the polyalkyl(semi)metalate in the polymer melt by adding at least one substance catalyzing the condensation forming a (semi)metal oxide phase distributed in the polymer in nanodispersed manner.
2. The process according to claim 1, wherein the catalyst is selected from Lewis acids and substances which release Lewis acids.

3. The process according to claim 2, wherein the catalyst is selected from organic sulfonic acids, boron trifluoride, bromides of phosphorus, chlorides of boron, aluminum, phosphorus, antimony, iron, zinc or tin.

4. The process according to claim 2, wherein the catalyst is used as a mixture with the polyalkyl(semi)metalate.

5. The process according to claim 1, wherein the catalyst is selected from transesterification catalysts.

6. The process according to claim 5, wherein the catalyst is selected from di-, tri-, and tetraalkylmetalates of zirconium, tin, aluminum, magnesium or titanium, trialkoxyvanadium (V) oxides, dialkoxytitanium-bis(ethylacetoacetonates), and salts of tin, magnesium, aluminum, zinc, lead, calcium, barium, strontium or zirconium with aliphatic carboxylic acids.

7. The process according to claim 1, wherein the catalyst comprises a base.

8. The process according to claim 7, wherein the base is used in combination with water.

9. The process according to claim 7, wherein the base is selected from nitrogen bases and alkaline metal hydroxides.

10. The process according to claim 9, wherein the catalyst comprises ammonia and/or an ammonia-releasing substance.

11. The process according to claim 1, wherein the liquid polyalkyl(semi)metalate is used in an amount of from 0.1 to 50% by weight based on the thermoplastic polymer.

12. The process according to claim 1, wherein the liquid polyalkyl(semi)metalate is a liquid poly[($C_{1-18}$-alkyl)silicate] or a modified, liquid poly[($C_{1-18}$-alkyl)silicate].

13. The process according to claim 1, wherein the liquid polyalkyl(semi)metalate has a number-average molecular weight of at least 1000 Daltons.

14. The process according to claim 1, wherein the liquid polyalkyl(semi)metalate has a viscosity below 100000 Pa·s at room temperature.

15. The process according to claim 1, wherein a finely divided material with a primary particle size below 500 nm is introduced additionally to the polymer melt together with the polyalkyl(semi)metalate.

16. The process according to claim 15, wherein the finely divided material is used in an amount of from 1 to 80% by weight, in particular in an amount of from 1 to 50% by weight based on the polyalkyl(semi)metalate.

17. The process according to claim 15, wherein the finely divided material is an oxidic material.

* * * * *